United States Patent [19]

Dieter

[11] Patent Number: 5,046,008

[45] Date of Patent: Sep. 3, 1991

[54] CONTROL DEVICE FOR STABILIZING THE ROLLING MOTION OF A VEHICLE

[75] Inventor: Konik Dieter, Herrsching, Fed. Rep. of Germany

[73] Assignee: Bayerische Motoren Werke AG, Fed. Rep. of Germany

[21] Appl. No.: 371,754

[22] Filed: Jun. 27, 1989

[30] Foreign Application Priority Data

Jun. 27, 1988 [DE] Fed. Rep. of Germany ....... 3821609

[51] Int. Cl.⁵ .......................................... B60G 17/015
[52] U.S. Cl. ........................... 364/424.05; 364/424.01; 280/707
[58] Field of Search ...................... 364/424.01, 424.05; 280/707

[56] References Cited

U.S. PATENT DOCUMENTS

| 4,679,808 | 7/1987 | Ito et al. | 364/424.01 |
| 4,804,203 | 2/1989 | Glaub et al. | 364/424.01 |
| 4,838,574 | 6/1989 | Baraszu | 364/424.01 |
| 4,882,693 | 11/1989 | Yopp | 364/424.01 |
| 4,938,499 | 7/1990 | Kawabata | 364/424.01 |

FOREIGN PATENT DOCUMENTS

| 0119564 | 9/1984 | European Pat. Off. |
| 2844413 | 10/1978 | Fed. Rep. of Germany |
| 3502337 | 1/1985 | Fed. Rep. of Germany |

*Primary Examiner*—Thomas G. Black
*Attorney, Agent, or Firm*—Evenson, Wands, Edwards, Lenahan & McKeown

[57] ABSTRACT

A control device is disclosed for stabilizing the rolling motion of a vehicle, having control elements which are arranged between the wheel carriers or wheel suspension members and the vehicle body. The control elements generate a stabilizer torque as a function of at least one cross-dynamic motional quantity at the front axle and rear axles, the stabilizer torques at the front axle and at the rear axle are being generated as a function of the measured and determined quantities of the yaw velocity, of the roll angle and of the roll angle rate.

14 Claims, 5 Drawing Sheets

CONTROL DEVICE FOR STABILIZING THE ROLLING MOTION OF A VEHICLE

BACKGROUND AND SUMMARY OF INVENTION

The invention relates to a control device for stabilizing the rolling motion of a vehicle, having control elements arranged between the wheel carriers or wheel suspension members and the vehicle body which generate a stabilizer torque at the front axle and a stabilizer torque at the rear axle as a function of at least one cross-dynamic motional quantity.

A control device of this type is known from German Published Unexamined Patent Application (DE-OS) 28 44 413. In this known control device, one stabilizer torque respectively is generated at the front axle and at the rear axle of the vehicle by means of hydraulically adjustable spring struts. These stabilizer torques at the front axle and at the rear axle of the vehicle counteract the rolling motion of the vehicle body which occurs during cornering. The adjustment of the hydraulic spring struts takes place by means of electrohydraulic valves which indicate the inflow or the outflow of the hydraulic fluid to or from the hydraulic spring struts corresponding to their respective degree of openness The control inputs of the electrohydraulic valves are electrically connected with the output of a controller which generates the control signals for the electrohydraulic valves as a function of the measured lateral acceleration of the vehicle It is a disadvantage of this known control device that the hydraulically adjustable spring struts of one vehicle side are acted upon by the same hydraulic pressure at the front axle and at the rear axle. As a result, during a fast steering of the vehicle into a cornering situation, dynamic wheel load fluctuations will occur which may lead to fluctuations of the cornering forces at the front axle and at the rear axle of the vehicle. These, in turn, lead to pendulum motions of the vehicle around the vertical axis of the vehicle and thus to an unstable handling of the vehicle It is therefore an object of the invention to provide a control device of the initially mentioned type by means of which, in addition to a minimizing of the roll angle of the vehicle body, an optimal handling can be achieved of a vehicle equipped with the control device according to the invention.

According to the invention, this object is achieved by an arrangement wherein the stabilizer torques $M_V$ and $M_H$ at the front axle and at the rear axle are generated as a function of measured or determined quantities of the yaw velocity $\dot{\psi}(t)$, of the roll angle, and of the roll angle rate $\dot{\gamma}(t)$ according to the following principles:

$$M_V(t) = k_{11}(V(t)i_m) \cdot \dot{\psi}(t) + k_{12} \cdot \gamma(t) + k_{13} \cdot \dot{\gamma}(t) \quad (I)$$

$$M_H(t) = k_{21}(V(t)i_M) \cdot \dot{\psi}(t) + k_{22} \cdot \gamma(t) + k_{23} \cdot \dot{\gamma}(t) \quad (II)$$

wherein $k_{11}$ and $k_{21}$ are coefficients depending on the driving speed $V(t)$ and on the stabilizer torque distribution $$i_M = \frac{M_H}{M_V + M_H}$$

during steady-state cornering, and $k_{12}$, $k_{22}$, $k_{13}$ as well as $k_{23}$ are vehicle-specific constant coefficients which are larger than zero.

As input quantities for the generating of the stabilizer torques, the control device according to the invention requires the driving speed $\psi$ as well as the variable quantities of yaw velocity, roll angle $\gamma$ and roll angle rate $\dot{\gamma}$. These variable quantities, corresponding to their weighting by the coefficients $k_{ij}$ with $i = 1, 2$ and $j = 1, 2, 3$, determine the stabilizer torque which, in each case, effects the front axle and the rear axle. The coefficients $k_{12}$, $k_{22}$, $k_{13}$ and $k_{23}$ of the rolling motion, are constant and thus independent of the driving speed $\gamma$ and of the steady-state stabilizer torque distribution $i_M$ between the front axle and the rear axle. By means of these coefficients, the dynamic behavior and the steady-state value of the roll angle $\gamma$ can be indicated.

The dynamic behavior of the yaw velocity $\dot{\psi}$, of the sideslip angle $\beta$ and of the resulting quantities, such as the lateral acceleration, can be indicated by means of the coefficients $k_{11}(V(t), i_M)$ and $k_{21}(V(t), i_M)$. The values or the characteristic-curve fields of the coefficients may be determined easily by means of simulation studies. The characteristic-curve fields of coefficients $k_{11}$ and $k_{21}$, for a certain vehicle type, are shown as an example in FIGS. 1 and 2. FIG. 1 shows that the coefficient $k_{11}$ at a constant steady-state stabilizer torque distribution $$i_M = \frac{M_H}{M_V + M_H}$$

rises almost linearly with an increasing driving speed V. FIG. 1 also shows that the characteristic $k_{11}$ lines, with an increasing value of the steady-state stabilizer torque distribution $i_M$, are shifted in the direction of lower $k_{11}$ values. FIG. 2 shows that coefficient $k_{21}$, at a constant steady-state stabilizer torque distribution $i_M$ falls off almost linearly with an increasing driving speed FIG. 2 also shows that the characteristic $k_{21}$ lines, with an increasing steady-state stabilizer torque distribution $i_M$, are shifted in the direction of higher $k_{21}$ values.

By means of a determination of the individual coefficients which is dependent on the respective vehicle type, particularly of coefficients $k_{11}$ and $k_{21}$, the damping behavior of the essential cross-dynamic motion quantities, such as the yaw velocity $\dot{\psi}$, the sideslip angle, the roll angle and the lateral acceleration of the "controlled" vehicle can clearly be improved in comparison to a vehicle with a conventional stabilizing of the rolling motion. This improvement increases with an increasing lateral acceleration. The dynamic behavior of the vehicle in the low lateral acceleration range - the driver is normally familiar with this range—is maintained also in the upper lateral acceleration range. The driver can therefore control the "controlled" vehicle more easily. These improvements are caused by the stabilizer torques $M_V$ and $M_H$ because of the fact that they distribute the changes of the normal wheel force occurring during cornering in such a manner between the front axle and the rear axle of the vehicle that, irrespective of the driving condition, an optimal distribution of the cornering forces is always ensured between the front axle and the rear axle. By means of the control device according to the invention, therefore, in addition to a minimizing of the roll angle during cornering, an optimal handling and roll steer effect is achieved of a vehicle equipped with the control device according to the invention.

The steady-state stabilizer torque distribution $$i_M = \frac{M_H}{M_V + M_H},$$

which occurs during steady-state cornering, is preferably selected to be not constant, but is determined as a function of the longitudinal acceleration of the vehicle $\dot{V}$ (t) and of the vehicle capacity weight $\Delta$ m. As a result, it is achieved that the stabilizer torques $M_V$ and $M_H$ and irrespective of the acceleration and of the capacity weight of the vehicle, are always distributed between the front axle and the rear axle in such a manner that the achievable lateral acceleration is maximized and at the same time a safe driving condition is maintained Thus, for example, a higher stabilizer torque $M_V$ may be applied at the front axle of the vehicle during braking than during the acceleration of the vehicle. As a result, the vehicle tends to corner less. In addition, for example, in the case of a vehicle with a high capacity weight in the rear area, a higher stabilizer torque can be applied at the rear axle of the vehicle than in the case of an unloaded vehicle.

Simulation studies for various vehicle types have shown that it is advantageous for coefficient $k_{12}$ to be larger than coefficient $k_{13}$, and for coefficient $k_{22}$ to be larger than coefficient $k_{23}$.

It was also found to be advantageous for the respective ratio of coefficients $k_{12}$ to $k_{22}$ and $k_{13}$ to $k_{23}$, in the case of standard dimensions, to be in the range of between 0.2 and 0.8.

In a further development of the invention, the body roll angle $\gamma_A$ (t) of the vehicle body relative to the wheel carriers or wheel suspension members and/or its derivative with respect to time $\dot{\gamma}_A$(t) is used for generating the stabilizer torques $M_V$ and $M_H$ at the front axle and the rear axle instead of the inertial roll angle $\gamma$ (t) and/or the inertia roll angle rate $\dot{\gamma}$ (t). This advantage of this further development of the invention consists of the easier measurability of the body roll angle $\gamma_A$ (t) in comparison to the inertial roll angle $\gamma$ (t). The body roll angle $\gamma_A$ (t) may be determined with very low measuring expenditures, for example, from the bump travel of the vehicle body relative to the wheel carriers or the wheel suspension members. This is also true for the body roll angle rate $\dot{\gamma}_A$ (t).

In order to keep the number of signals to be measured as low as possible, according to a further development of the invention, the roll angle rate $\dot{\gamma}$ (t) is obtained by status filtering or, when a digital computer is used, by the numerical differentiation of the roll angle $\gamma$ (t).

The determination of the longitudinal acceleration $\dot{V}$ (t) of the vehicle by status filtering or, when a digital computer is used, by the numerical differentiation of the driving speed V (t) serves the same purpose.

According to a further development of the invention, the stabilizer torques $M_V$ and $M_H$ at the front axle and at the rear axle of the vehicle are generated also as a function of the sideslip angle $\beta$ (t) and/or of the steer angle $\delta$ (t), in addition to the above-mentioned input quantities. This further development of the invention has excellent control dynamics.

If, according to a further development of the invention, individual cross-dynamic motional quantities, particularly the roll angle $\gamma$, the yaw velocity $\dot{\psi}$, or the roll angle rate $\dot{\gamma}$, are determined by means of a vehicle-specific model of cross-dynamics (simulator) as a function of the steering angle $\delta$ (t), these cross-dynamic motional quantities no longer have to be measured If all cross-dynamic motional quantities of principles (I) and (II) of the stabilizer torques at the front axle and the rear axle are generated by means of the vehicle-specific model of cross-dynamics as a function of the steering angle, and these estimated values are used instead of the real motional quantities in principles (I) and (II) for the stabilizer torques, a controlling device is obtained on the basis of the control device, by means of which, as a function of the steering angle, of the driving speed and possibly of the vehicle capacity weight, the stabilizer torques are generated at the front axle and the rear axle.

This type of a vehicle-specific model of cross-dynamics (simulator) is determined by the following mathematic equations.

$$\dot{\beta}(t) = a_{11}(V)\cdot\beta(t) + a_{12}(V)\cdot\dot{\psi}(t) + a_{13}(V)\cdot\gamma(t) + a_{14}(V)\cdot\dot{\gamma}(t) + b_1(V)\cdot\delta(t)$$

$$\ddot{\psi}(t) = a_{21}\cdot\beta(t) + a_{22}(V)\cdot\dot{\psi}(t) + a_{23}\cdot\gamma(t) + a_{24}\cdot\dot{\gamma}(t) + b_2\cdot\delta(t)$$

$$\ddot{\gamma}(t) = a_{31}\cdot\beta(t) + a_{32}(V)\cdot\dot{\psi}(t) + a_{33}\cdot\gamma(t) + a_{34}\dot{\gamma}(t) + b_3\cdot\delta(t)$$

wherein the coefficients $a_{ij}$, j=1, and $a_{i2}$, i=1, ..., 3 depend on the driving speed V(t), all other coefficients are constant, $\dot{\beta}$(t) is the derivative of the sideslip angle $\beta$(t), $\ddot{\psi}$(t) is the yaw acceleration, i.e. the second derivative of the yaw $\psi$(t), and $\ddot{\gamma}$(t) is the roll angle acceleration, i.e. the second derivative of the roll angle $\gamma$(t). When a digital computer is used instead of an analog computer, this analog vehicle-specific model of cross-dynamics may naturally be replaced by its equivalent model with discrete values in time.

Principles (I) and (II) for the generating of stabilizer torques at the front axle and at the rear axle naturally apply to an implementation of a controller which is constant in time as well as for a controller which has discrete values in time on a digital computer.

Other objects, advantages and novel features of the present invention will become apparent from the following detailed description of the invention when considered in conjunction with the accompanying drawings.

DETAILED DESCRIPTION OF THE DRAWINGS

Figure 3:
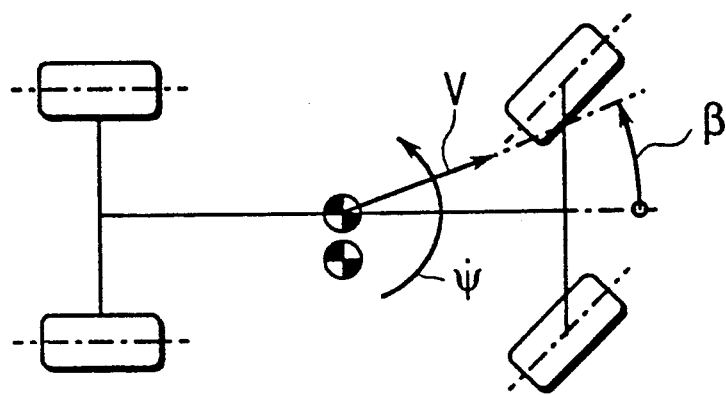
FIG. 3 is a schematic representation of a vehicle chassis, depicting control features of preferred embodiments of the present invention.
Figure 4:
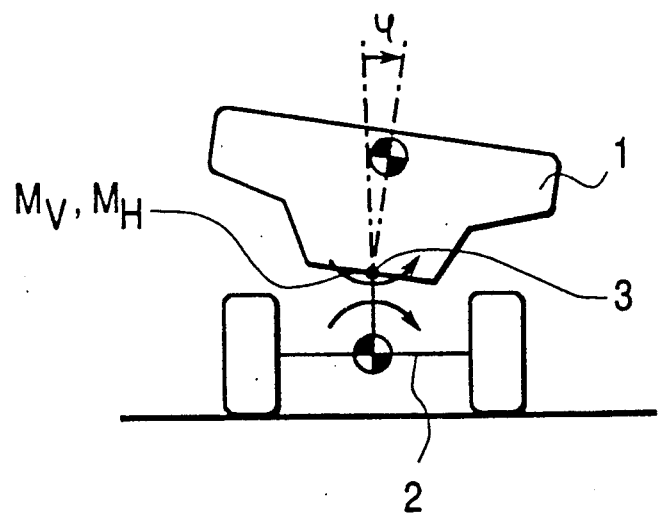
FIG. 4 is a schematic representation of a rear view of a vehicle, depicting control features of preferred embodiments of the present invention.

FIGS. 3 and 4 have the purpose of explaining the essential cross-dynamic motional quantities of a vehicle In FIG. 3, vector V shows the driving speed of the vehicle in moving direction of the center of gravity of the vehicle. In addition, $\dot{\psi}$ denotes the yaw velocity. The yaw velocity is the change in time of the yaw $\psi$ which is determined by the rotating movement of the vehicle around its vertical axis which extends through the center of gravity of the vehicle. In addition, in the basic drawing of FIG. 3, the sideslip angle $\beta$ is entered which is determined by the direction of the vehicle longitudinal axis and by the moving direction of the center of gravity of the vehicle.

The basic drawing of FIG. 4 also shows the roll angle $\gamma$ of the vehicle body 1 around a roll axis 3 located between the vehicle body 1 and the wheel suspension members 2 and extending in longitudinal direction of the vehicle. Finally, FIG. 4 also shows the direction of the effect of the stabilizer torques $M_V$ and $M_H$ at the front axle and the rear axle. The orientation of these cross-dynamic motional quantities as well as the direction of the effect of the stabilizer torques at the front axle and at the rear axle are shown in FIGS. 3 and 4.

Figure 5:
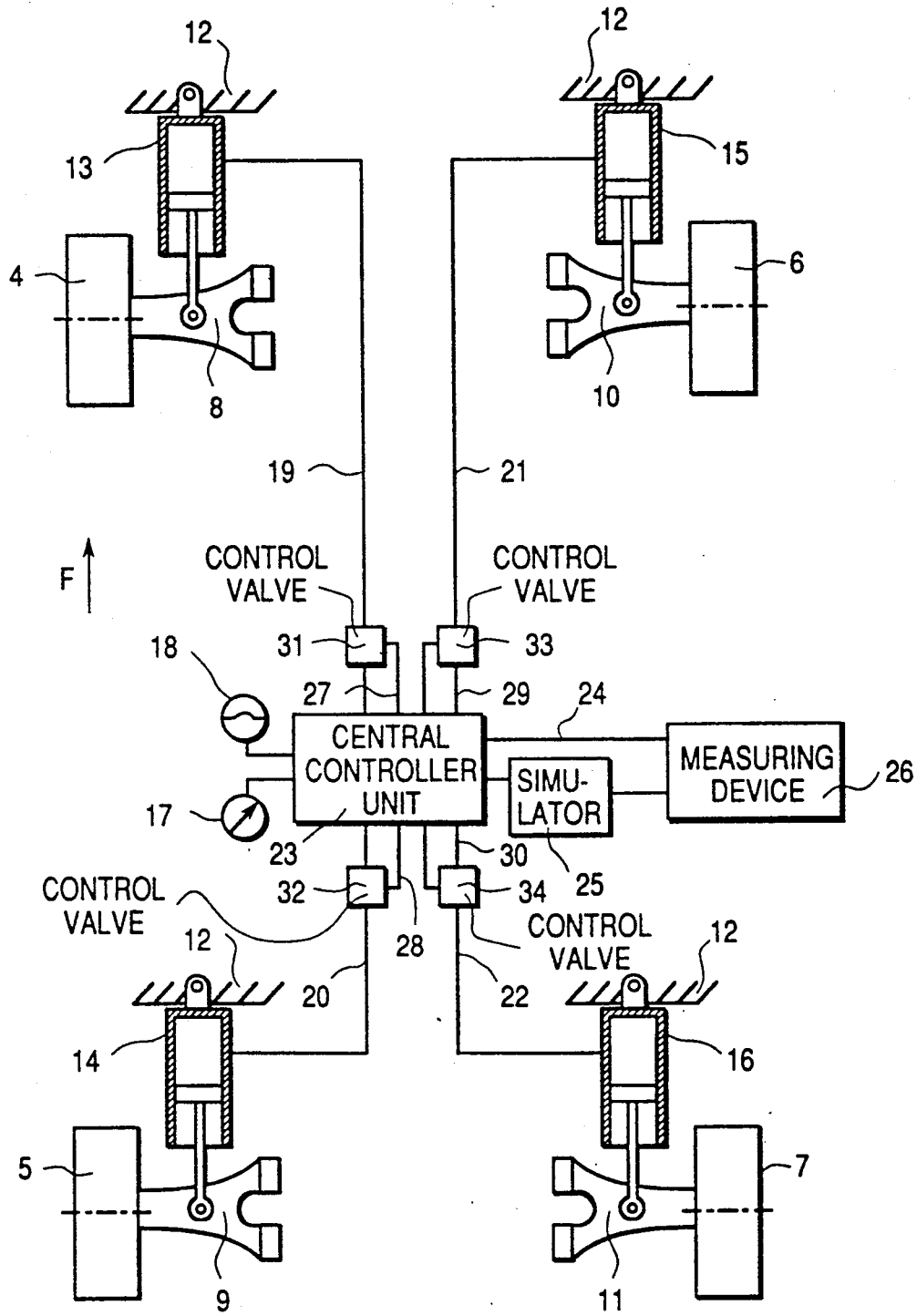
FIG. 5 is a basic schematic representation of the essential components of a control device constructed according to preferred embodiments of the invention.

The control device, which in FIG. 5 is shown as a basic drawing, is used for stabilizing the rolling motion and at the same time for improving the handling of a vehicle which is driving forward in the direction of arrow F. The control device has one control element 13, 14, 15, or 16 respectively at each vehicle wheel 4, 5, 6 or 7 between the respective wheel carrier or wheel suspension element 8, 9, 10 or 11 and the vehicle body 12. While the control elements 13 and 15 at the front axle of the vehicle build up a stabilizer torque which counteracts the rolling motion of the vehicle body 12, the control elements 14 and 16 generate a corresponding stabilizer torque at the rear axle of the vehicle. In the shown embodiment, the control elements 13, 14, 15 and 16 are constructed as hydraulic cylinder-piston units which can be acted upon by hydraulic pressure by means of a pressure generating device 17. For the possible reduction of hydraulic pressure, the cylinder-piston units 13, 14, 15 and 16 are connected to a pressure accumulator 18.

In order to obtain a simple representation, only one of the hydraulic lines 19, 20, 21 and 22 is shown in each case for the connection of the cylinder-piston units 13, 14, 15 and 16 with the pressure generating device 17 and the pressure accumulator 18.

The nucleus of the control device shown in FIG. 5 is a central controller unit 23. This central controller unit 23 is connected to a measuring device 26, on one side, directly by means of electric lines 24 and, on the other side, with the insertion of a simulator 25. It generates control signals as a function of variable quantities measured by the measuring device 26 and estimated by means of the simulator on the basis of the measured steer angle $\delta$, such as the yaw velocity $\dot{\psi}$, the roll angle $\gamma$, or the roll angle rate $\dot{\gamma}$. By means of control lines 27, 28, 29 and 30, these are supplied to the control inputs of control valves 31, 32, 33 and 34 arranged in the hydraulic lines 19, 20, 21 and 22. These control valves 31, 32, 33 and 34 control the pressure buildup and the pressure reduction in the cylinder-piston units 13, 14, 15 and 16.

In the controller unit 23, the control signals supplied to the control valves 31, 32, 33 and 34 are preferably determined as a function of the yaw velocity $\dot{\psi}$, the roll angle $\gamma$, the roll angle rate $\dot{\gamma}$, the vehicle longitudinal acceleration $\dot{V}$ and the vehicle capacity weight $\Delta m$. The determination of the control signals, in this case, takes place in such a manner that the stabilizer torques $M_V$ and $M_H$ and at the front axle and at the rear axle are generated according to the following principles:

$$M_V(t) = k_{11}[V(t), i_M(\dot{V}(t), \Delta m)]\cdot\dot{\psi}(t) + k_{12}\cdot\dot{\gamma}(t) + k_{13}\cdot\gamma(t) \quad (I)$$

$$M_H(t) = k_{21}[\dot{V}(t), i_M(V(t),\Delta m)]\cdot\dot{\psi}(t) + k_{22}\cdot\dot{\gamma}(t) + k_{23}\cdot\gamma(t) \quad (II)$$

Figure 1:
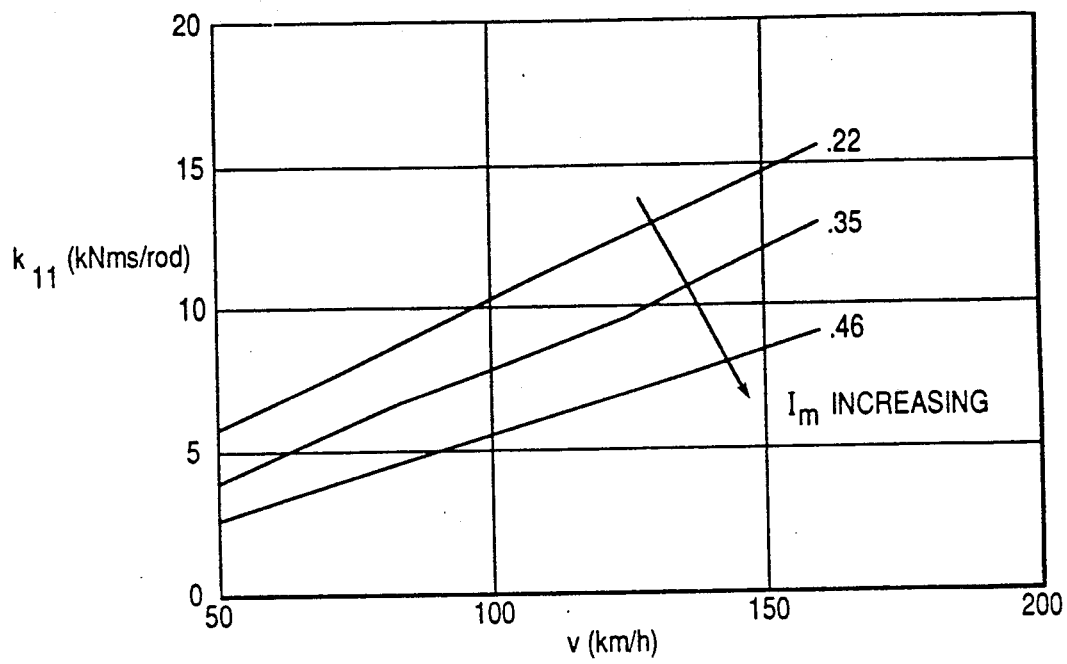
FIG. 1 is a chart depicting characteristic curve fields, for coefficients $K_{11}$ as a function of vehicle velocity for a certain vehicle type, determined in accordance with preferred embodiments of the invention.
Figure 2:
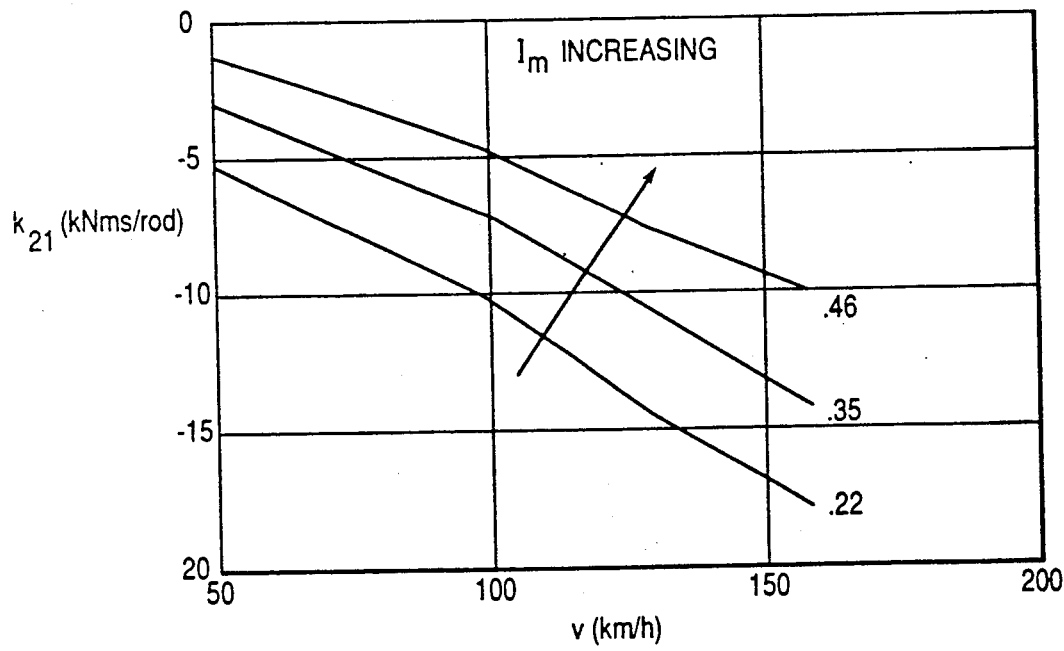
FIG. 2 is a chart depicting characteristic curve fields, for coefficient $K_{21}$ as a function of vehicle velocity for a certain vehicle type, determined in accordance with preferred embodiments of the invention.

In these principles, the coefficients $k_{11}$ and $k_{21}$ are a function of the driving speed V and of the stabilizer torque distribution $$i_M = \frac{M_H}{M_V + M_H}$$

during steady-state cornering. These dependencies of the coefficients $k_{11}$ and $k_{21}$ are shown in FIGS. 1 and 2 for a certain vehicle type. The other coefficients $k_{12}$, $k_{22}$, $k_{13}$ as well as $k_{23}$ are constant and larger than zero. Their values depend only on the respective vehicle type and can be determined by simulation studies.

In order to achieve, in addition to the stabilization of the rolling motion, also an optimal handling of the vehicle, the steady-state stabilizer torque distribution $i_M$ is not fixed as a constant value, but is determined as a function of the vehicle longitudinal acceleration $\dot{V}$ and of the vehicle quantities to be measured, the roll angle rate $\dot{\gamma}$ as well as the vehicle longitudinal acceleration $\dot{V}$ are preferably obtained by means of status filtering or, when a digital computer is used, by means of numerical differentiation of the roll angle $\gamma$ and of the driving speed V.

By means of the simulator 25, as a function of the steer angle $\delta$, estimated values can be produced for the course of the side slip angle $\beta$ and the roll $\dot{\gamma}$ angle as well as the yaw velocity $\dot{\psi}$ and the roll angle rate $\dot{\gamma}$. If these estimated values are processed further in the controller unit 23 instead of the corresponding real cross-dynamic motional quantities, the controller unit 23 takes over the function of controlling the stabilizer torques $M_V$ at the front axle and the rear axle of the vehicle. The particular advantage of this type of a control is the small number of the quantities to be measured. In addition to the steer angle $\delta$, only the vehicle capacity weight $\Delta m$, the driving speed V and its derivative with respect to time $\dot{V}$ are required. The controller unit 23 as well as the simulator 25 may be implemented by an analog computer as well as by a digital computer which operates with discrete values in time.

Figure 6:
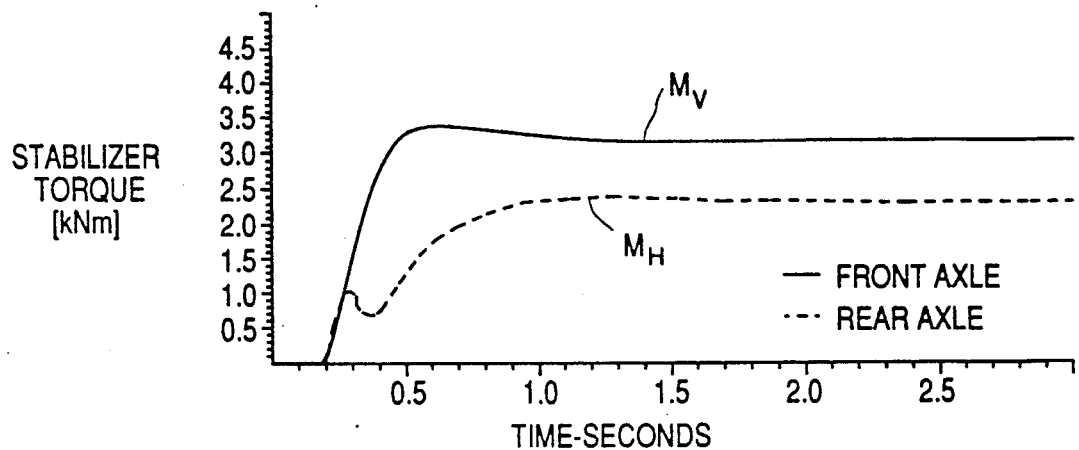
FIG. 6 is a graph depicting courses of the stabilizer torques at the front axle and at the rear axle at the time of a steer angle jump.

FIG. 6 shows the courses of the stabilizer torques $M_V$ and $M_H$ at the front axle and the rear axle generated by the control device of FIG. 5 in the case of a steer angle jump. It is shown that the stabilizer torques $M_V$ and $M_H$, in an almost vibration-free manner, rise from their common initial value (0 kNm) to their steady-state final values. It is also shown that, at the start of the steer angle jump, at first, a higher stabilizer torque is applied to the rear axle than to the front axle.

Figure 7:
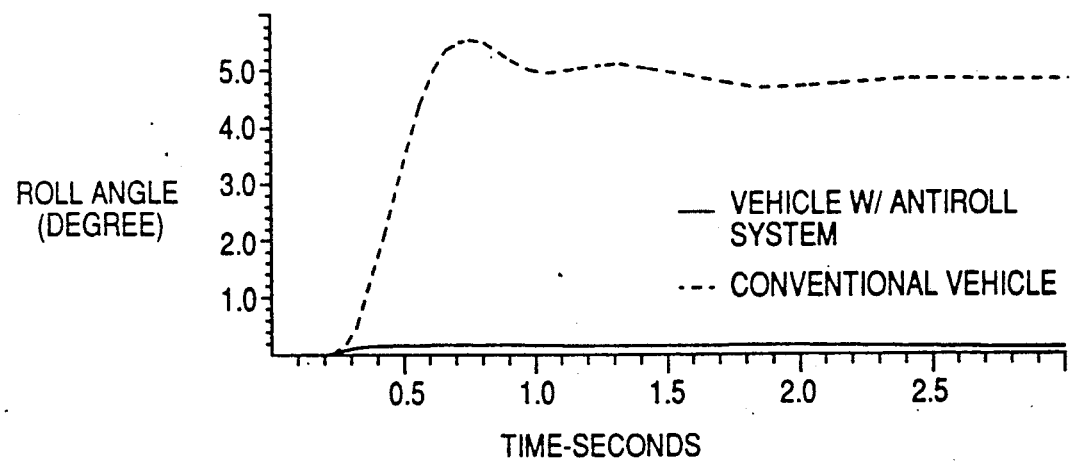
FIG. 7 is a graphical representation of the roll angle course in the case of a vehicle equipped with the control device according to the invention in comparison to a conventional vehicle.
Figure 8:
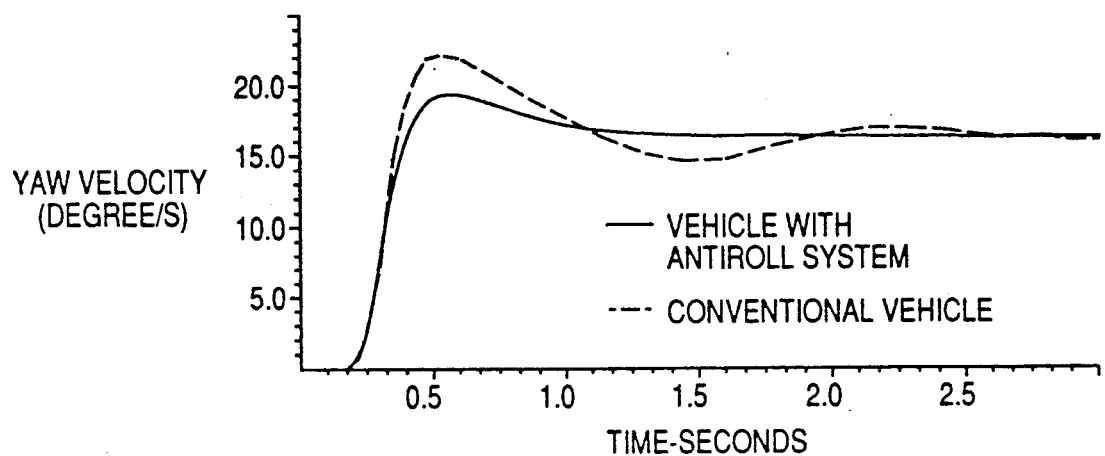
FIG. 8 is a graphical representation of the yaw velocity course in the case of a vehicle equipped with the control device according to the invention in comparison to a conventional vehicle.
Figure 9:
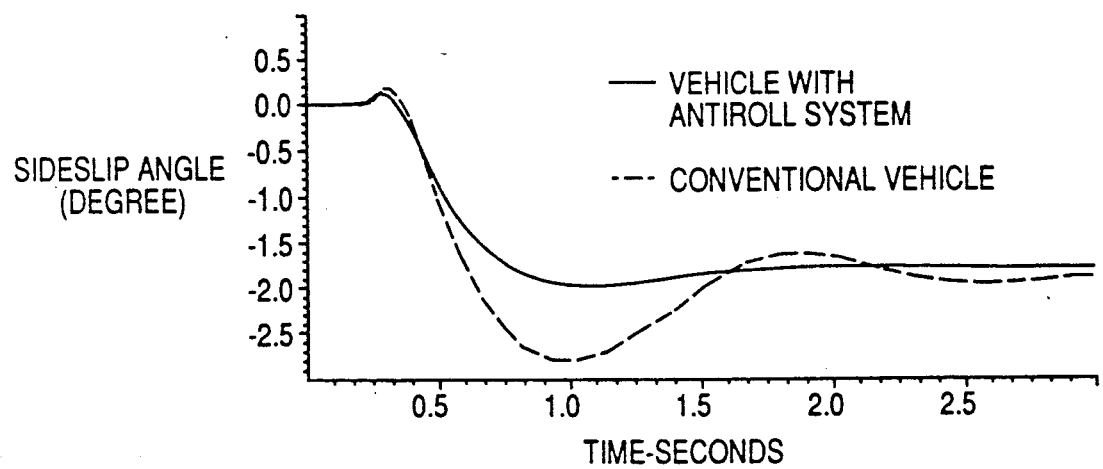
FIG. 9 is a graphical representation of the side slip angle course in the case of a vehicle equipped with the control device according to the invention in comparison to a conventional vehicle

FIGS. 7 to 9 show the most important cross-dynamic motional quantities which occur in the case of a steer angle jump in a vehicle equipped with a control device according to the invention in comparison to a conventional vehicle.

Thus FIG. 7 shows that the roll angle $\gamma$, in the case of a vehicle equipped with a control device according to the invention, is minute, whereas, in the case of a conventional vehicle, with the assumed steer angle jump, it is approximately 5°.

FIG. 8 compares the courses of the yaw velocity $\dot{\psi}$ in the case of a vehicle equipped with the control device according to the invention and in the case of a conventional vehicle. While, in the case of the conventional vehicle, the yaw velocity swings to a steady-state value not before approximately 2 seconds have passed, the yaw velocity, in the case of a vehicle equipped with the control device according to the invention, is so damped that almost no overswinging can be recognized.

FIG. 9 shows the difference between a vehicle equipped with the control device according to the invention and a conventional vehicle even more clearly While the sideslip angle $\beta$ of a vehicle equipped with the control device according to the invention adjusts itself to the new steady-state value without any tendency to swing, a distinct overswinging of the slideslip angle can be recognized in the case of the conventional vehicle.

As shown particularly in FIGS. 8 and 9, the handling of a vehicle equipped with the control device according to the invention is clearly improved in comparison with a conventional vehicle, because the yaw velocity $\dot{\psi}$ and also the sideslip angle $\beta$ are subjected to almost no swings which could be the result of undesirable pendulum movements of the vehicle around its vertical axis.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A control device for stabilizing the rolling motion of a vehicle comprising:
   control elements arranged between at least one of wheel carriers and wheel suspension members of the vehicle and a body of the vehicle; and
   controller means for operating the control elements as a function of at least one cross-dynamic motional quantity to generate a stabilizer torque $M_V$ at a front axle of the vehicle and a stabilizer torque $M_H$ at a rear axle of the vehicle;
   the controller means including means for generating the stabilizer torques $M_V$ and $M_H$ as a function of measured or determined quantities of a yaw velocity $\dot{\psi}(t)$, or an inertial roll angle $\gamma(t)$ and of a roll angle rate $\dot{\gamma}(t)$ according to the following principles:

$$M_V(t) = k_{11}(V(t), i_M) \cdot \dot{\psi}(t) + k_{12} \cdot \gamma(t) + k_{13} \dot{\gamma}(t) \quad (I)$$

$$M_H(t) = k_{21}(V(t), i_M) \cdot \dot{\psi}(t) + k_{22} \cdot \gamma(t) + k_{23} \cdot \dot{\gamma}(t) \quad (II)$$

wherein $k_{11}$ and $k_{21}$ are coefficients depending on the driving speed $V(t)$ and on the stabilizer torque distribution $$i_M = \frac{M_H}{M_V + M_H}$$

during steady-state cornering, and $K_{12}$, $k_{22}$, $k_{13}$, and $k_{23}$ are vehicle-specific constant coefficients which are larger than zero.

2. A control device according to claim 1, wherein the controller means includes means for calculating the steady-state stabilizer torque distribution $$i_M = \frac{M_H}{M_V + M_H}$$

as a function of the vehicle longitudinal acceleration $\dot{V}(t)$ and the vehicle capacity weight $\Delta m$.

3. A control device according to claim 2, further comprising means for obtaining a vehicle longitudinal acceleration $\dot{V}(t)$ by one of the method of status filtering and the method of numerical differentiation of the driving speed $V(t)$ by means of a digital computer.

4. A control device according to claim 1, wherein the coefficient $k_{12}$ is higher than the coefficient $k_{13}$, and the coefficient $k_{22}$ is higher than the coefficient $k_{23}$.

5. A control device according to claim 4, wherein the respective ratios of coefficients $k_{12}$ to $k_{22}$ and $k_{13}$ to $k_{23}$ are in the range between 0.2 and 0.8 for a vehicle having standard dimensions.

6. A control device according to claim 1, wherein respective ratios of coefficients $k_{12}$ to $k_{22}$ and $k_{13}$ to $k_{23}$ are in the range between 0.2 and 0.8 for a vehicle having standard dimensions.

7. A control device according to claim 1, further comprising means for obtaining the roll angle rate $\dot{\gamma}(t)$ by one of the method of status filtering and the method of numerical differentiation of the roll angle $\gamma(t)$ by means of a digital computer.

8. A control device according to claim 1, wherein the controller means includes means for generating the stabilizer torques $M_V$ and $M_H$ at the front axle and at the rear axle as a function of the sideslip angle $\beta(t)$.

9. A control device according to claim 1, wherein the controller means includes means for generating the stabilizer torques $M_V$ and $M_H$ at the front axle and at the rear axle as a function of the steer angle $\delta(t)$.

10. A control device according to claim 1, further comprising simulator means for determining at least one cross-dynamic motional quantity, selected from the group of a roll angle, a yaw velocity, and a roll angle rate, by means of a vehicle-specific model of cross-dynamics as a function of the steer angle $\delta(t)$.

11. A control device according to claim 10, wherein the vehicle-specific model is described by the mathematic equations $$\dot{\beta}(t) = a_{11}(V) \cdot \beta(t) + a_{12}(V) \cdot \dot{\psi}(t) + a_{13}(V) \cdot \gamma(t) + a_{14}(V) \cdot \dot{\gamma}(t) + b_1(V) \cdot \delta(t)$$

$$\ddot{\psi}(t) = a_{21} \cdot \beta(t) + a_{22}(V) \cdot \dot{\psi}(t) + a_{23} \cdot \gamma(t) + a_{24} \cdot \dot{\gamma}(t) + b_2 \cdot \delta(t)$$

$$\ddot{\gamma}(t) = a_{31} \cdot \beta(t) + a_{32}(V) \cdot \dot{\psi}(t) + a_{33} \cdot \gamma(t) + a_{34} \cdot \dot{\gamma}(t) + b_3 \cdot \delta(t)$$

wherein the coefficients $a_{1j}$, $j = 1 \ldots 4$, $b_1$, and $a_{i2}$, $i = 1, \ldots, 3$ depend on the driving speed $V(t)$, all other coefficients are constant.

12. A control device for stabilizing the rolling motion of a vehicle comprising:
control elements arranged between at least one of wheel carriers and wheel suspension members of the vehicle and a body of the vehicle; and
controller means for operating the control elements, as a function of at least one cross-dynamic motional quantity, to generate a stabilizer torque $M_V$ at a front axle of the vehicle and a stabilizer torque $M_H$ at a rear axle of the vehicle;
the controller means including means for generating the stabilizer torques $M_V$ and $M_H$ as a function of measured or determined quantities of a yaw velocity $\dot{\psi}(t)$, of a body roll angle $\gamma(t)$ and of a body roll angle rate $\dot{\gamma}_A(t)$ according to the following principles:

$$M_V(t) = k_{11}(V(t), i_M) \cdot \dot{\psi}(t) + k_{12} \cdot \gamma_A(t) + k_{13} \cdot \dot{\gamma}(t) \quad (I)$$

$$M_H(t) = k_{21}(V(t), i_M) \cdot \dot{\psi}(t) + k_{22} \cdot \gamma_A(t) + k_{23} \cdot \dot{\gamma}_A(t) \quad (II)$$

wherein $k_{11}$ and $k_{21}$ are coefficients depending on the driving speed $V(t)$ and on the stabilizer torque distribution $$i_M = \frac{M_H}{M_V + M_H}$$

during steady-state cornering, and $k_{12}$, $k_{22}$, $k_{13}$, and $k_{23}$ are vehicle-specific constant coefficients which are larger than zero.

13. A control device according to claim 12 further comprising means for obtaining the roll angle rate $\dot{\gamma}(t)$ by one of the method of status filtering and the method of numerical differentiation of the roll angle $\gamma(t)$ by means of a digital computer.

14. A control device according to claim 13, further comprising means for obtaining a vehicle longitudinal acceleration $\dot{V}(t)$ by one of the method of status filtering and the method of numerical differentiation of the driving speed $V(t)$ by means of a digital computer.

* * * * *